Jan. 25, 1944.    A. HANSEN, JR    2,340,122
MAGNET SUSPENSION
Filed June 30, 1942

Inventor:
Albert Hansen Jr.,
by Harry E. Dunham
His Attorney.

Patented Jan. 25, 1944

2,340,122

UNITED STATES PATENT OFFICE 2,340,122

MAGNET SUSPENSION

Albert Hansen, Jr., Nahant, Mass., assignor to General Electric Company, a corporation of New York Application June 30, 1942, Serial No. 449,075

10 Claims. (Cl. 308—1)

My invention relates to permanent magnet devices, such for example as magnetic suspensions for shafts, employing a pair of permanent magnet systems, each system having a plurality of permanent magnets so arranged with magnetic poles of like polarity closely confronting each other as to obtain an intense concentration of flux and correspondingly large magnetic force in a small space and high efficiency utilization of the permanent magnet materials.

The present invention may be applied to various permanent magnet force devices to materially increase the useful magnet force for a given amount of permanent magnetic material used or to decrease the amount of magnetic material used to obtain a given magnetic force.

The invention is particularly useful where space is limited and it is desirable t outilize the permanent magnet materials at high efficiency.

Figure 1:
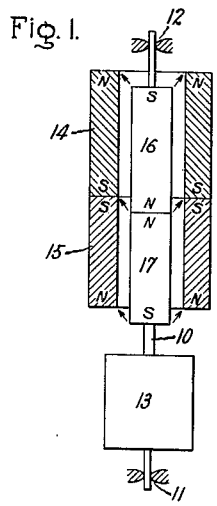
Figure 2:
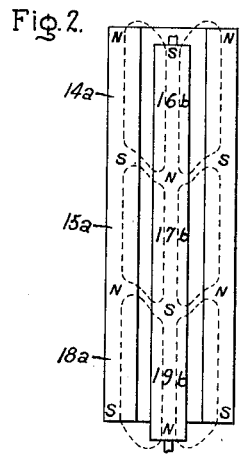
Figure 3:
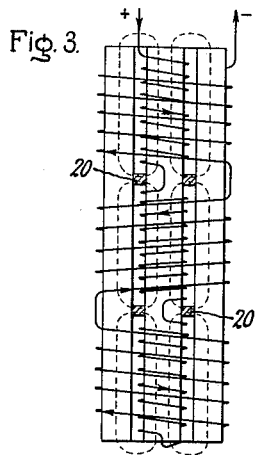
Figure 4:
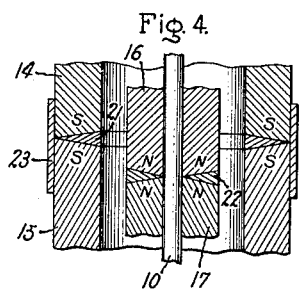
Figure 5:
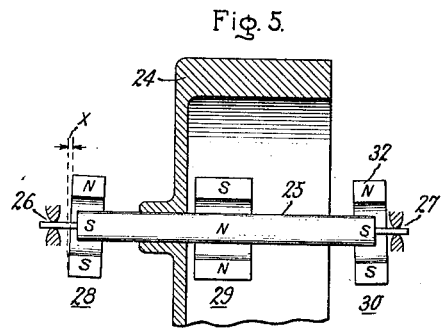
Figure 6:
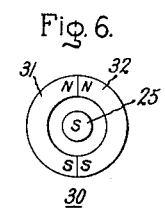
Figure 7:
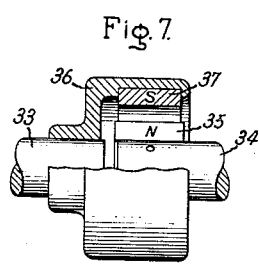
Figure 8:
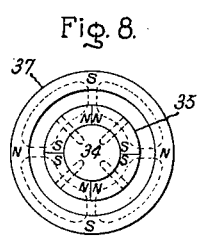

The features of my invention which are believed to be novel and patentable will be pointed out in the claims appended hereto. For a better understanding of my invention reference is made in the following description to the accompanying drawing in which Fig. 1 illustrates a magnetic suspension for vertical shafts embodying my invention and utilizing two permanent magnets in each of the relatively movable systems; Fig. 2 illustrates an embodiment of the invention employing three permanent magnets in each of the relatively movable systems; Fig. 3 illustrates a polarization principle; Fig. 4 illustrates a detail modification with respect to abutting surfaces of magnetic pole pieces; Figs. 5 and 6 are side section and end views of a magnetic suspension for horizontal shafts embodying the present invention; Figs. 7 and 8 are partial side and end views of a flexible coupling embodying my invention, and in Fig. 9 the invention is applied to an electric measuring instrument.

Referring now to Fig. 1, I have represented here a magnetic suspension suitable for a rotating shaft 10 having guide bearings indicated at 11 and 12. 13 represents the weight of any suitable part mounted on the shaft. The weight of the rotating element is supported by a magnetic suspension comprising two permanent magnetic systems, one of which, comprising permanent magnets 14 and 15, is stationary and the other of which, comprising permanent magnets 16 and 17, is mounted on the shaft and is rotatable.

The stationary magnets are in the shape of hollow cylinders magnetized axially and vertically with like poles abutting or closely confronting each other, as indicated. These magnets are shown in cross-section to better show the inner magnets on the shaft. The movable magnets are cylindrical in shape, of the same or approximately the same axial length as the outer magnets and of a diameter less than the inner diameter of the outer magnets so as to freely telescope therein as represented. The magnets 16 and 17 may have an axial opening fitting the shaft. The inner magnets are also magnetized in the direction of their vertical axis with like poles abutting or closely confronting each other but with the abutting poles of reverse polarity to the abutting poles of the stationary magnets. The relative vertical position of the two magnet systems is such that unlike poles are adjacent each other with the magnets on the suspended system slightly below those of the stationary system when the suspended system is loaded as indicated. If magnets 15 and 17 were removed, the suspension would be similar to that of my prior application, Serial No. 359,732, filed October 4, 1940, where there is attraction between the adjacent opposite magnetic poles of the magnets 14 and 16 tending to lift the lower suspended magnet and thus support the weight of the rotating shaft assembly.

I have found that using the arrangement shown in Fig. 1 the lifting force is increased approximately four times as compared to what it would be if magnets 14 and 16 were used alone. That is, by doubling the permanent magnet material used in the suspension the lifting power is increased about four times or the efficiency of the material as thus employed in a magnetic suspension is approximately doubled as compared to that of my prior application. These improved results were obtained with strictly axially magnetized magnets without the refinements hereinafter described in connection with Figs. 2, 3 and 4.

It is seen that there are lifting forces of attraction at three points along the shaft between the adjacent pole pieces of unlike polarity on the stationary and movable magnet systems as indicated by the upwardly pointing arrows. There is probably also some supporting force of repulsion between the like poles on the two systems but the like poles are sufficiently separated that this repulsion force is relatively unimportant. It is believed that the principal feature responsible for the remarkable improvement found is due to the fact that the central unlike poles of magnets 14 and 15 which confront each other and the central unlike poles of magnets 16 and 17 which confront each other result in an extraordinary concentration of flux force in a confined region, creating adjacent opposite polarity magnetic poles of great stiffness and correspondingly great attractive force. The fluxes at these abutting pole pieces apparently tend to be forced out at right angles rather than being comparatively free to spread out in all directions as is the case at the upper and lower end pole pieces of the systems. The result of two abutting pole pieces of like polarity produces the effect of a single intense magnetic pole of the same polarity. Tests have demonstrated that quite unexpected and very remarkable increase in efficiency is obtained in magnetic force devices of this character where the permanent magnets are thus employed. In such demonstration I used permanent magnets of similar high coercive force material with the two magnets in each system of the same dimensions. My investigations indicated that any good high coercive force permanent magnet material may be used. The axial length of individual magnets of a given coercive force should be great enough that when stabilized they are not further demagnetized when two are thus placed close together with like poles confronting each other as represented.

Additional permanent magnets may be added to the systems of Fig. 1 and also the magnets of a system may be made from the same integral piece of material where the abutting poles of like magnetic polarity are consequent magnetic poles as represented in Fig. 2. In Fig. 2, we have magnets 14a, 15a and 18a in the outer system and magnets 16b, 17b and 19b in the inner system. The dividing lines between the abutting poles of like polarity in the systems are entirely of a magnetic nature and are indicated by polarity marks and dotted flux indicating lines.

Whether the magnets be separated pieces as in Fig. 1 or integral as in Fig. 2, I expect it will be advantageous where feasible to permanently magnetize the magnets so as to have the lines of polarization correspond as nearly as possible to the paths which the flux lines naturally tend to take in use. For example, I may have the consequent magnet poles in the outer system of Fig. 2 come on the inside and the consequent magnetic poles of the inner system of Fig. 2 come on the outside. This can be accomplished in the manner indicated in principle in Fig. 3 by using windings connected for the desired polarization and placing soft iron washers 20 between the two systems at the consequent pole points during polarization. In Figs. 2 and 3 the outer system is assumed to be shown in cross-section, but the cross-section shading has been omitted to avoid confusion with other lines. Owing to the space limitations for the necessary magnetizing windings it may generally be desirable to magnetize the two systems separately and by suitable magnetizing apparatus and Fig. 3 is intended to represent a principle and not necessarily actual polarization practice.

I may also accomplish somewhat the same result using separate, strictly axially polarized magnets by the expedient represented in Fig. 4. Let Fig. 4 represent the abutting magnetic pole portions of like magnetic polarity of Fig. 1 as modified by grinding off the abutting pole pieces to form V-shaped recesses; the resulting recess of the outer system facing inwardly and the resulting recess of the inner system facing outwardly, and preferably filling these recesses with high permeability low coercive force inserts 21 and 22. Cutting away the high coercive force material requires less distortion of the flux and the high permeability inserts provide a low reluctance path assisting in turning and in the concentration of the fluxes and in directing them in the desired directions. At 23 in Fig. 4 I have represented a band of non-magnetic material for supporting the outer magnets in proper alignment and spacing. Non-magnetic shaft 10 serves this purpose for the inner magnets. Care should be taken to provide true concentric surfaces between stationary and rotating parts of such magnetic systems particularly for vertical shaft suspensions and where, as in Fig. 4, high permeability material is used for inserts. Eccentricity will produce non-symmetrical magnetic sidewise pull detrimental to balance and causing friction and wear in guide bearings. Where high permeability inserts are employed as at 21 and 22, Fig. 4, the shape and dimensions of such material should preferably be such that it will be saturated radially by the permanent magnet fluxes. An excess of this material which does not become saturated radially would provide an undesirable tangential path for fluxes and an unsymmetrical radial distribution of the fluxes if there is any eccentricity.

Figs. 5 and 6 show partial side and end views of a magnetic suspension for a horizontal shaft embodying my invention. For example, the fly wheel 24 and shaft magnet 25 may represent the rotating element of a gyroscope, the weight of which is supported magnetically and having small bearings 26 and 27 primarily for guiding purposes.

It will be evident that instead of providing two mechanically separate permanent magnets with poles of unlike polarity abutting each other to obtain the highly concentrated magnet pole the two permanent magnets may be formed in the same piece of material as a consequent pole magnet. The shaft magnet structure 25 is so formed and is magnetized to have a north pole at its center and south poles at its two ends as indicated in Fig. 5. The stationary magnetic system comprises three magnet groups 28, 29 and 30, each group comprising two semi-circular permanent magnets as shown at 31 and 32, Fig. 6, in the end view of magnet group 30. In the side view, Fig. 5, only the semi-circular magnets to the rear of the shaft are shown. The semi-circular magnets are magnetized with the polar axis or flux running in a peripheral direction so that the magnetic poles are at the diametrically spaced ends and the pairs of magnets, such as magnets 31 and 32, are placed together with like magnetic poles confronting each other as shown in Fig. 6. The north poles of magnets 31 and 32 thus form a concentrated north pole, etc. The stationary circular magnet groups thus formed encircle the shaft magnet 25, group 28 adjacent the left-hand south pole of the shaft magnet, group 29 at the north consequent pole of the shaft magnet and group 30 at the right-hand south pole end of the shaft magnet. It will be further noted that the stationary magnets are so oriented that the concentrated poles which attract with respect to the adjacent magnet pole of the shaft magnet are above the shaft and the stationary magnetic poles which repel the adjacent shaft magnetic poles are beneath the shaft. Hence there are both attraction and repulsion magnetic forces tending to lift the shaft and parts carried thereby at three horizontally displaced points where the stationary magnets are placed.

The center group of stationary magnets 29 is made somewhat larger than the end groups to accommodate the increased flux of the shaft magnet at this point. To give endwise stability to the shaft the tops of the end stationary magnet groups may be inclined inwardly at a small angle X, as represented. It is now seen that the important principle of my invention, namely, that of forming highly concentrated magnetic poles by placing permanent magnets with like poles abutting each other is embodied in both the stationary and rotatable magnetic systems. The invention is used to produce all magnetic poles of the stationary magnet systems and to produce the center consequent north pole of the shaft magnet 25. Additional forms of magnetic suspensions for horizontal shafts are described in my copending application, Serial No. 424,781, filed December 29, 1941, and the present invention may be applied thereto.

The invention is also applicable to the magnetic force responsive device of my copending application, Serial No. 428,896, filed January 30, 1942.

Figs. 7 and 8 show the application of my invention to form a flexible coupling between shafts 33 and 34. On the end of shaft 34 there is bolted or otherwise secured four sector shaped permanent magnets 35 each making up one-quarter of a hollow cylinder so that when secured together as shown they form a complete circle. Like poles abut each other to form a four pole assembly with alternate north and south magnetic poles arranged in a circle generally analogous to the arrangement of the magnetic poles of the rotor of certain forms of dynamo electric machines. Secured to the adjacent end of shaft 33 by a die cast flange part 36 is a hollow cylindrical member 37 of permanent magnet material magnetized so as to form four permanent magnets each occupying a quadrature sector and with like poles abutting or confronting each other. The parts 34 and 36 are made of non-magnetic material. Magnet system 37 surrounds system 35 with a suitable amount of clearance. It is evident that the four equally spaced magnetic poles of system 35 will attract the four equally spaced magnetic poles of opposite polarity of system 37 so that considerable driving torque may be transmitted through the magnetic clutch or coupling thus formed. Also, that the coupling is flexible as regards axial alignment, endwise alignment and rotational alignment.

Figure 9:
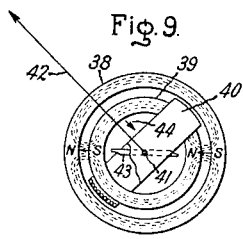

In Fig. 9 I have shown the invention as applied to an electrical measuring instrument in which the stationary unidirectional flux field is produced by concentric magnet systems 38 and 39 in the form of hollow cylinders each made in one part but magnetized with consequent poles to form two semi-circular permanent magnets with like poles abutting each other. Both systems are stationary in this device. Also, the poles of the outer system are adjacent unlike poles of the inner system so as to produce a concentrated flux across the air gap between them, as illustrated. In the air gap is the moving coil 40 of a direct current instrument pivoted on the axis of the magnets at 41 and carrying a pointer or the like 42. The rotating element may also carry a small bar 43 of magnetic material to act with respect to the flux of the inner permanent magnet system to furnish a zero restoring torque for the instrument. When direct current flows in moving coil 40 in a direction to produce a flux in the direction of arrow 44 a clockwise torque will be produced proportional to such current and a corresponding clockwise deflection will result.

The question of whether it is preferable to use separate permanent magnets as the magnets 14 and 15, Figs. 1 and 4, or 31 and 32, Fig. 6, or unitary permanent magnets as at 25, Fig. 5, or 37, Fig. 8, in forming the confronting magnetic poles of unlike polarity will depend upon the practicability of permanently magnetizing the structures involved, the distribution of flux desired, the involved, the distribution of flux desired, the matter of assembly with other parts, etc.

What I claim as new and desire to secure by Letters Patent of the United States is:

1. In a permanent magnet structure a pair of permanent magnet systems each including a plurality of permanent magnets, the two systems being arranged so that the magnetic poles of permanent magnets of one system are adjacent permanent magnet pole pieces of the other system in order that the magnetomotive forces of such permanent magnets may create corresponding flux forces between the two systems, characterized by the fact that in each system there are permanent magnets with magnetic poles of like polarity abutting each other to form in effect an intense single magnetic pole of such polarity and that one such intense magnet pole of one system is adjacent to and cooperates with another such intense magnetic pole of opposite polarity in the other system.

2. In a permanent magnet structure, means for producing a highly concentrated flux across an air gap between magnetic poles of unlike polarity comprising a first permanent magnet system including a pair of permanent magnets having magnetic poles of like polarity abutting each other, and a second permanent magnet system including a pair of permanent magnets having magnetic poles of like polarity abutting each other, the abutting poles of one of such systems being of one magnetic polarity and the abutting poles of the other of such systems being of the opposite magnetic polarity, the magnetic poles of opposite magnetic polarity thus created by said abutting poles of the two systems being sufficiently closely adjacent each other as to cause a substantial portion of the flux emanating from such permanent magnets to pass between such magnetic poles.

3. A permanent magnet suspension comprising a stationary permanent magnet system and a movable permanent magnet system, each comprising a plurality of permanent magnets, the magnetic poles of the permanent magnets of the two systems being so disposed adjacent each other that the flux forces between them tend to support the weight of the movable system, each system containing permanent magnets having poles of like magnetic polarity abutting each other to form in effect a single intense magnetic pole of the same polarity, such intense magnetic pole of one polarity in the stationary system being slightly above and adjacent such intense magnetic pole of the opposite polarity in the movable system.

4. A magnetic suspension for vertical shafts comprising in combination with a vertical shaft a pair of cylindrical permanent magnets carried by and coaxial with said shaft, one above the other, and reversely magnetized in an axial direction with magnetic poles of like polarity abutting each other, a pair of cylindrical stationary permanent magnets coaxial with said shaft, one above the other, and reversely magnetized in an axial direction with magnetic poles of like polarity abutting each other, the stationary magnets being of approximately the same length as the shaft magnets and being positioned slightly above and in free telescoping relation with respect to the shaft magnets, and the magnetic poles of the stationary magnets being adjacent unlike poles of the shaft magnets.

5. In a permanent magnet structure means for producing a highly concentrated flux across an air gap between magnetic poles of unlike polarity comprising a first permanent magnet system including a pair of permanent magnets having pole pieces of like magnetic polarity abutting each other, a second permanent magnet system including a pair of permanent magnet pole pieces of like magnetic polarity abutting each other, the abutting poles of one of such systems being of one magnetic polarity and the abutting pole pieces of the other system being of the opposite magnetic polarity, the magnetic poles of opposite magnetic polarity thus created being adjacent each other, the abutting of said pole pieces being modified by the provision of wedge shaped recesses between them so that they abut only at the pole piece edges which are furthest removed from the adjacent magnet pole of opposite polarity.

6. A permanent magnetic structure as set forth in claim 5 in which high permeability low coercive force magnetic material is contained within the wedge shaped recesses and is normally saturated by the flux passing between the poles of opposite magnetic polarity.

7. In a permanent magnet structure, means for producing a highly concentrated flux across an air gap between magnetic poles of unlike polarity comprising a first permanent magnet system including a pair of permanent magnets formed in the same piece of high coercive force material and having magnetic poles of like polarity abutting each other and a second permanent magnet system including a pair of permanent magnets having magnetic poles of like polarity abutting each other, the abutting poles of one such system being of one polarity and the abutting poles of the other system being of the opposite polarity, the magnetic poles of opposite magnetic polarity thus created being spaced apart by an air gap through which a substantial part of the flux emanating from said magnetic poles crosses.

8. In a permanent magnet structure, two systems of permanent magnets each comprising the same even number of sector shaped permanent magnets with magnetic poles of like polarity abutting each other with the magnets arranged in a circle, one system being inside and substantially concentric to the other and the two systems being separated by a substantially concentric air gap threaded by the fluxes of said magnets.

9. In a permanent magnet structure a permanent magnet system comprising an even number of sector shaped permanent magnets arranged in a circle with magnetic poles of ilke polarity abutting each other, and a second permanent magnet system adjacent to and magnetically cooperating with the first system.

10. In a permanent magnet structure, two systems of permanent magnets each comprising the same even number of sector shaped permanent magnets arranged in a circle with the magnetic poles thereof abutting each other, one system being inside, separated from and substantially concentric to the other, at least one of said systems comprising an integrating ring of permanent magnet material with the magnets thereof formed by virtue of consequent magnetic poles in said material.

ALBERT HANSEN, Jr.